United States Patent [19]

Bubik et al.

[11] Patent Number: 5,421,495
[45] Date of Patent: Jun. 6, 1995

[54] VEHICLE ROOF RACK

[75] Inventors: Leslie Bubik; Leslie Bubik, Jr., both of Toronto, Canada

[73] Assignee: Inovative Bycicle Design Inc., Toronto, Canada

[21] Appl. No.: 226,324

[22] Filed: Apr. 12, 1994

[51] Int. Cl.$^6$ ............................ B60R 9/10; B60R 9/042
[52] U.S. Cl. ...................... 224/42.03 B; 224/310; 224/324; 224/282; 414/462
[58] Field of Search ................ 224/42.03 B, 309, 310, 224/314, 315, 318, 319, 320, 321, 282, 310, 324; 248/188.5; 414/462

[56] References Cited

U.S. PATENT DOCUMENTS

| | | | |
|---|---|---|---|
| 2,531,778 | 11/1950 | Merner | 248/188.5 |
| 2,803,349 | 8/1957 | Talbot | 224/42.03 B |
| 3,638,844 | 2/1972 | Bronson | 224/319 |
| 4,339,223 | 7/1982 | Gotze | 414/462 |
| 4,386,709 | 6/1983 | Graber | 224/42.03 B |
| 4,452,384 | 6/1984 | Graber | 224/314 |
| 4,524,893 | 6/1985 | Cole | 224/42.03 B |
| 4,702,401 | 10/1987 | Graber et al. | 224/42.03 B |
| 5,135,145 | 8/1992 | Hannes et al. | 224/42.03 B |
| 5,190,195 | 3/1993 | Fullhart et al. | 224/42.03 B |
| 5,284,282 | 2/1994 | Mottino | 224/310 |
| 5,303,857 | 4/1994 | Hewson | 224/42.03 B |
| 5,360,151 | 11/1994 | Fine | 224/310 |

FOREIGN PATENT DOCUMENTS

| | | | |
|---|---|---|---|
| 57824 | 8/1982 | European Pat. Off. | 224/315 |
| 515957 | 12/1952 | France | 224/314 |
| 381537 | 10/1964 | Switzerland | 414/462 |
| 1759686 | 9/1992 | U.S.S.R. | 224/314 |

OTHER PUBLICATIONS

Advertisements in bicyle magazine (name of publication unknown), pp. 46 and 73 to 75.
Advertisement in Tule brochure, entitled Bikes.

*Primary Examiner*—Henry J. Recla
*Assistant Examiner*—Gregory M. Vidovich
*Attorney, Agent, or Firm*—Hill & Schumacher

[57] ABSTRACT

A roof rack for use with vehicles. The roof rack includes a frame attachable to the roof of a car and an arm movable relative to the frame between a first position wherein a portion of the arm is positioned below the roof along the side of the car and a second position wherein a portion of the arm is positioned above the roof of the car. The device also comprises a lock for locking the arm in its second position. The roof rack includes a stop mechanism for stopping the movement of the arm at its first position and selecting the first position such that the arm, or the object mounted thereto, does not touch the side of the car. The device is well suited to mounting bicycles onto the roofs of cars.

4 Claims, 3 Drawing Sheets

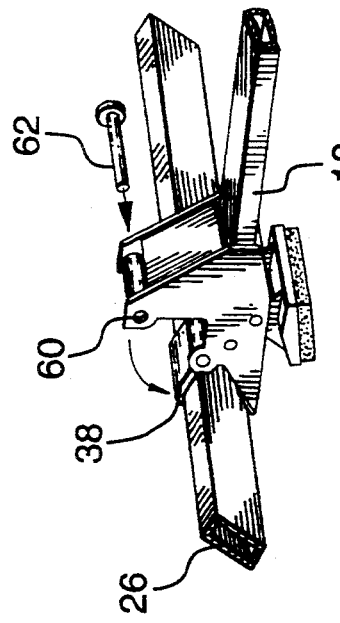
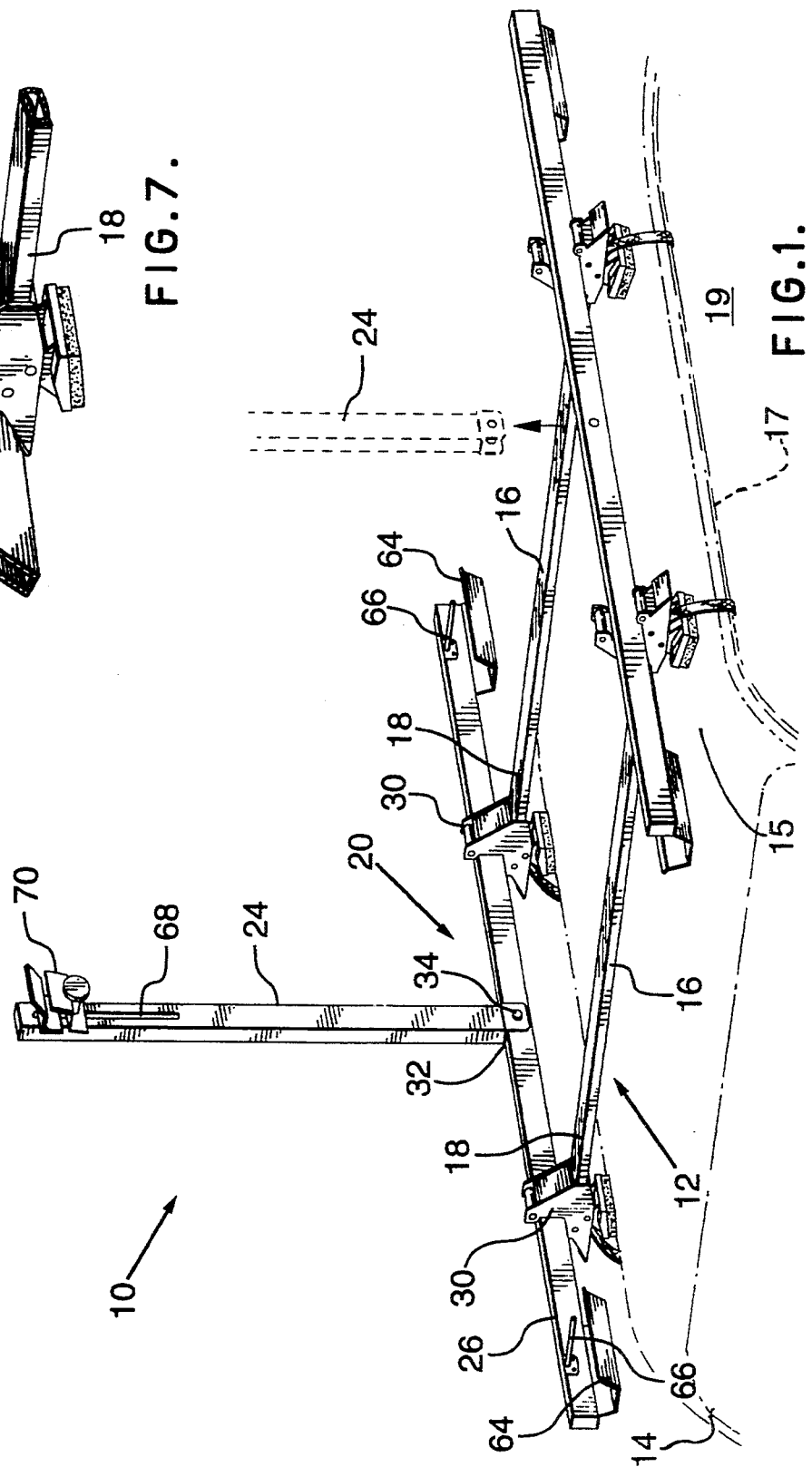

VEHICLE ROOF RACK

FIELD OF THE INVENTION

The present invention relates generally to roof racks for use with vehicles for mounting objects onto the tops of the vehicles.

BACKGROUND OF THE INVENTION

It is well known to carry objects such as luggage and bicycles on the roof of vehicles such as cars by means of a roof rack. Roof racks come in many varieties; however, they usually include a rack and an attachment means for securely and releasably mounting the rack to the roof of the car. The roof rack attachment means may comprise a series of adjustable straps which secure the roof rack onto the roof of the car. These straps are usually provided with hooks and usually attach to the door jams of the car. In some types of roof racks, the attachment means comprises a series of suction cups which secure the roof rack member to the roof of the car by suction. The roof rack attachment means may also comprise a combination of suction cups and straps.

The geometry of the rack portion of the roof rack varies depending on the type of objects to be mounted, but typically the rack consists of several longitudinal beams arranged in parallel to extend transversely across the roof of the car. The beams may be provided with bumper pads on their underside which bear against the car roof to provide support. The bumper pads may be made of rubber or plastic, and in some cases may comprise suction cups. The straps (where straps are used as the attachment means) usually comprise a long strap mounted to the end of each of the beams. The lengths of the straps are usually adjustable to tighten the beams onto the roof. When the rack is mounted in place on the vehicle roof, the ends of the beams are positioned at either side of the car. Elastic cords (such as bungee cords) or straps are usually used to secure the object to the beams. In some cases the beams have special projections for providing convenient attachment points for the bungee cords, while in other cases the beams are provided with clamps for securing specific objects such as skiis.

Certain roof racks are designed and dedicated for carrying specific objects. Racks designed for carrying bicycles for instance often have a plurality of straps and beams for rigidly securing the frame of the bicycle so that it will not move during transport. The beams usually include special slots for receiving the wheels of the bicycle. Racks designed to carry canoes often comprise two pairs of plastic pads which attach to the gunnel of the canoe.

A drawback to existing roof racks is the requirement that the user lift and place the object on top of the roof rack first and then secure it to the rack by means of clamps or elastic cords. Positioning the object on the roof rack can normally be accomplished if the user is of at least average height and if the object is both conveniently shaped, such as a suitcase, and relatively light. The task becomes difficult if the object is heavy and awkwardly shaped e.g. a bicycle, or if the person loading the object has health problems such as a bad back. If the object is awkwardly shaped or heavy, then the only way to place the object onto the roof rack is to either enlist the aid of another person or to use a ladder. It is possible that either the person loading the object, or the object itself, may suffer a fall as a result of the loading process. Therefore, it would be advantageous to provide a vehicle roof rack which simplifies the task of loading and securing objects onto the roof of a vehicle.

SUMMARY OF THE INVENTION

The present invention provides a roof rack for a roof of a vehicle, the roof having opposed side edges and the vehicle having a side portion extending substantially downwardly from each side edge. The roof rack comprises a frame attachable on top of the roof of the vehicle. The frame includes a pair of spaced beams and at least one cross member extending therebetween having opposed end portions, each beam being pivotally coupled to the end portions of the cross member. Each beam is adapted to engage the wheels of a bicycle. The roof rack includes at least one arm member rigidly attached to one of the beams, the beam and arm member attached thereto being pivotally movable with respect to the cross member between a first position wherein a portion of the arm member is positioned substantially below the roof and adjacent to but spaced from the side portion of the vehicle and a second position wherein the portion of the arm member is positioned substantially above the roof of the vehicle. The roof rack is provided with lock means for releasibly locking the arm member in the second position and attachment means for releasably attaching a bicycle to the arm member.

BRIEF DESCRIPTION OF THE DRAWINGS

A roof rack constructed in accordance with the present invention will now be described, by example only, reference being had to the accompanying drawings, in which:

FIG. 1 is a perspective view of the vehicle roof rack mounted to the roof of a car with the member in its raised position.

FIG. 7 is a perspective view of the hinge mechanism of the present invention showing the member in its lowered position.

DETAILED DESCRIPTION OF THE INVENTION

Figure 3:
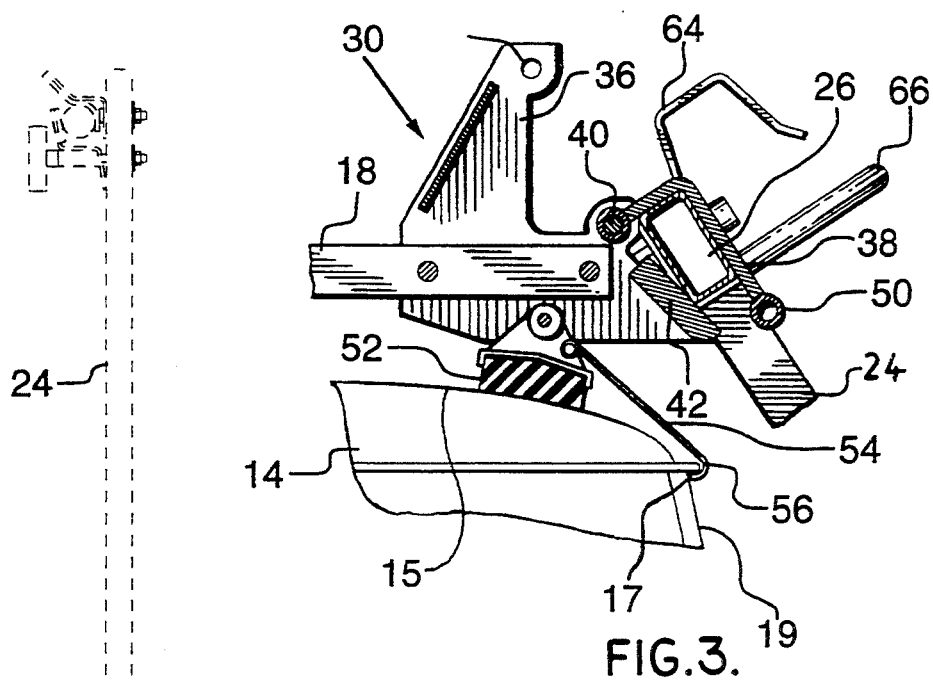
FIG. 3 is a side view, partly in cross-section, of the hinge portion of the vehicle roof rack mounted to the roof of the car with the arm in its lowered position.

Referring firstly to FIG. 1, a roof rack constructed in accordance with the present invention is shown generally at 10 and includes a frame 12 mountable to the roof 15 of a vehicle 14, and member 20 movably mounted to frame 12. Frame 12 as shown includes longitudinal beams 16 having end portions 18. Beams 16 extend transversely across the roof of vehicle 14 with end portions 18 located at the side edges 17 of the vehicle roof 15. Member 20 comprises an elongate arm 24 which is rigidly secured to a cross-member or base 26 which is pivotally attachable to end portions 18 of beams 16 by hinges 30.

Frame 12 may be attached to the roof 15 of vehicle 14 by known roof rack attachment means (not shown) which permits roof rack 10 to be both securely and releasably mounted onto the roof of the vehicle. It will be appreciated that there are a number of possible methods for attaching the roof rack to roof 15 vehicle 14. One such roof rack attachment means may comprise suction cups mounted onto the underside of beams 16, the suction cups being adapted to firmly grip the roof 15. Alternatively, the roof rack attachment means may comprise a series of straps wherein one end of each strap is attached to one end of beams 16, and the other end of each strap is provided with a hook for attaching the strap to the side edge 17 roof 15. A combination of suction cups and straps may also be used.

Frame 12 may comprise a platform such as a board or sheet (not shown) attached to the top surface of beams 16 which spans the length and width of the vehicle roof. Plastic pads may be mounted to the bottom of beams 16 to prevent damage to the roof.

Figure 2:
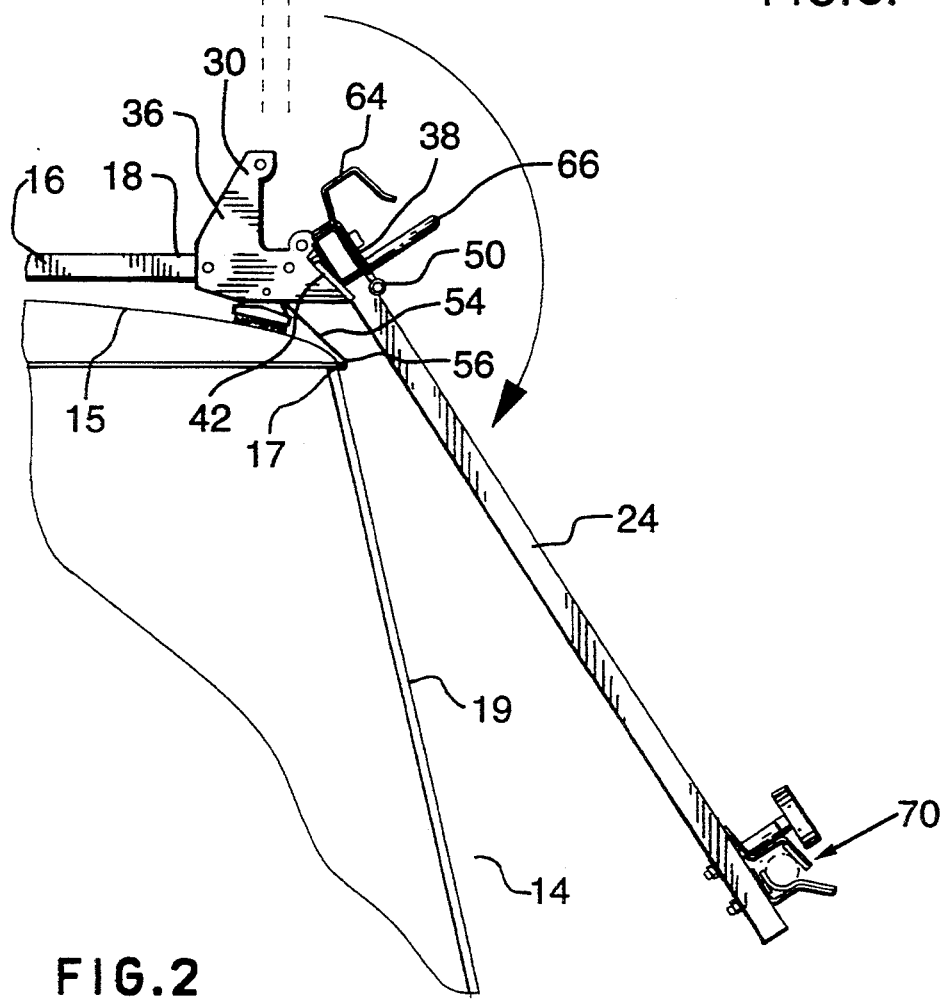
FIG. 2 is a side view of the vehicle roof rack mounted to the roof of a car with the member in its lowered position.

Elongate arm 24 is rigidly secured to cross-member or base 26 at 32 by bolt 34 in such a way that arm 24 can be detached from the base if preferred. Base 26 is pivotally attachable to end portions 18 of beams 16 by hinge mechanism shown generally at 30. Hinge mechanism 30 permits base 26 and therefore arm 24 to pivot between its lower position, as seen in FIG. 2, and its raised position, as seen in FIG. 1.

Referring to FIG. 3, hinge mechanism 30 comprises a bracket 36 which is mounted onto end portions 18 of beams 16, and a bracket 38 which is mounted to cross-member 26. Brackets 36 and 38 are pivotally attached together by means of a pin 40 passing through both brackets. Bracket 36 is provided with stop 42 for stopping the pivotal movement of bracket 38 when arm 24 is at its lowered position as illustrated. Brackets 36 are attached to beams 16 by means of bolts or the like.

Bracket 36 is supported above the roof 15 of vehicle 14 by a block 52. Block 52 may be made of plastic or rubber and acts to protect the roof of vehicle 14. Strap 54 is attached to bracket 36 and is provided with a hook 56 which is adapted to hold onto side edge 17 of the vehicle roof 15. Strap 54 helps to secure bracket 36 to the roof of vehicle 14 and, in some embodiments, may act as the mounting means for mounting the entire roof rack to the car.

Figure 5:
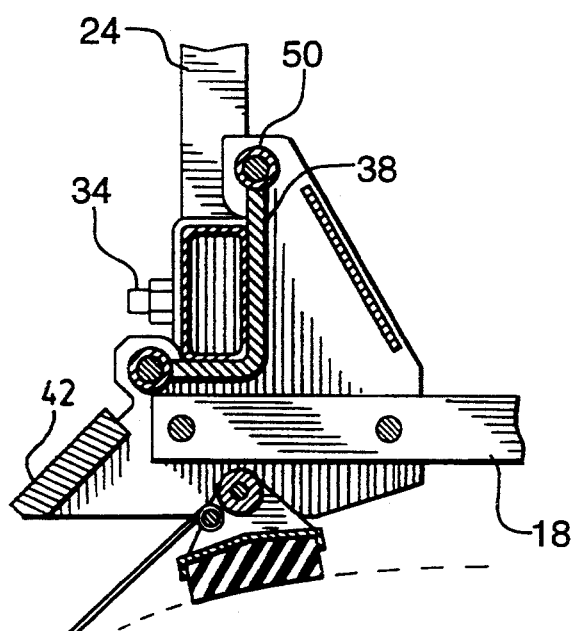
FIG. 5 is a side view, partly in cross section, of the hinge portion of the vehicle roof rack mounted onto the roof of a car with the arm in its raised position.

Attached to bracket 38 is an aperture 50. As best seen in FIGS. 5 and 7, when arm 24 is in the raised position, aperture 50 is positioned adjacent aperture 60 located in bracket 36. A codder pin or bolt 62 is passed through apertures 60 and 50 holding bracket 38 it in place to prevent arm 24 from pivoting back to the down position thereby locking arm 24 in the raised position. Arm 24 is moved to the lowered loading position with the arm adjacent the vehicle by first removing the pin from aperture 60.

An alternate locking mechanism may be provided for locking arm 24 in the raised position. In particular, aperture 60 of bracket 36 may be replaced with a spring loaded racket configured to be received in aperture 50 and lock bracket 38 into position when bracket 38 is pivoted to the raised position. A variety of other releasable locking mechanisms may also be employed.

Arm 24, base 26 and hinges 30 may form an integral part of a car roof rack; however, the arm, base and hinges may form a separate item which attaches to an existing roof rack of the car. If this is the case, then brackets 38 are configured so that they can be attached directly to the cross beams of a standard roof rack.

Figure 4:
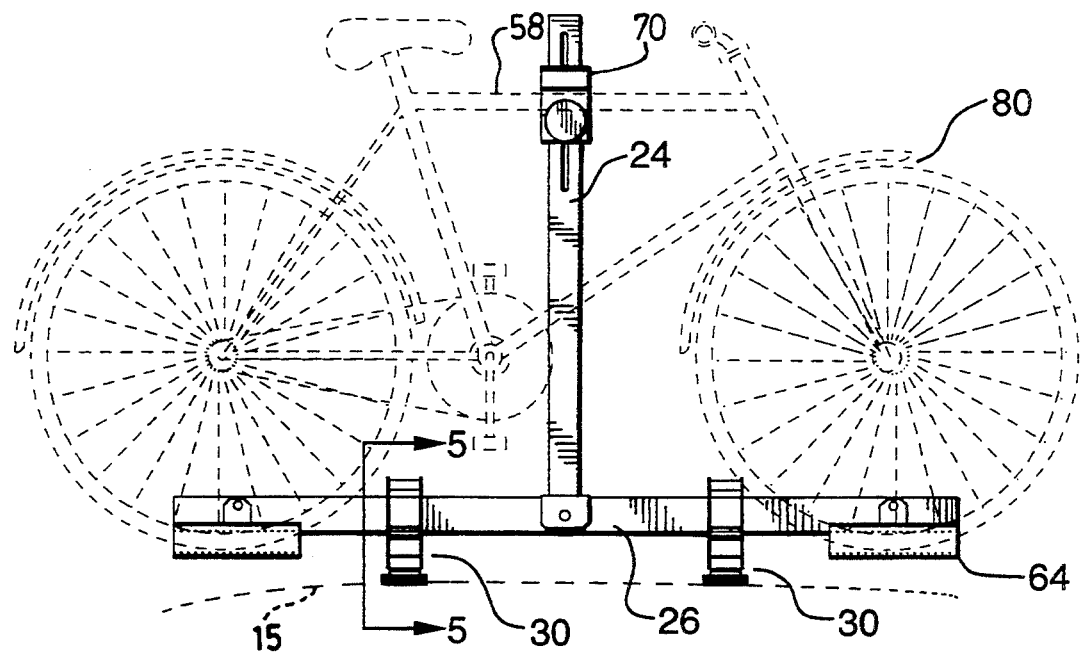
FIG. 4 is a side view of the vehicle roof rack mounted onto the roof of a car and with a bicycle mounted thereon.
Figure 6:
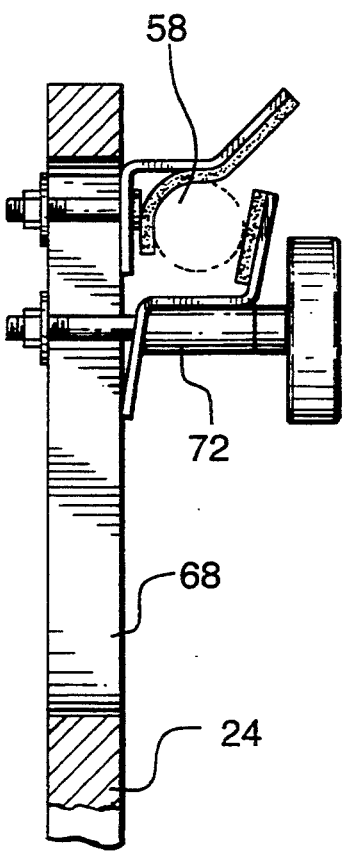
FIG. 6 is a side view, partly in cross section, of a portion of the arm of the vehicle roof rack.

Referring to FIGS. 1 and 4, roof rack 10 may be adapted for loading and carrying a variety of objects. When adapted to carry bicycles, roof rack 10 would preferably include wheel wells 64, which are attached to base member 26 and which are adapted to retain the tires of the bicycle, and pins 66 which are also attached to base 26 and which are configured to fit between the spokes of the bicycle wheels and secure the bicycle wheels. Arm 24 is provided with an elongate slot 68 (FIGS. 1 and 2) and a bicycle locking means 70. As can be seen from FIG. 6, locking means 70 comprises a clamp 72 which can clamp directly to the frame of the bicycle and which is slidingly movable in slot 68. Clamp 72 may be moved along aperture 68 and locked at any position and thereby retain a variety of different sized bicycle frames.

While roof rack 10 has been illustrated showing an arm 24 adjacent to each 5 edge 17 of roof is see FIG. 1, it will be understood that an arm 24 and associated locking means may be located on only one side of the vehicle.

In operation, a bicycle 80 may be loaded onto the roof 15 of vehicle 14 by first lowering arm 24 into its lowered position wherein it extends downwardly and adjacent to but spaced from side 19 of vehicle 14, see FIG. 2. Bicycle 80 is then inverted and the wheels are engaged with pins 66 and clamp 72 is tightened around frame 58 of the bicycle. Once secured on arm 24, the arm is swung upwards to the raised position and locked in place by passing a codder pin 62 through apertures 60 and 50, thereby securing bracket 38 in its raised position. The bicycle locked to arm 24 with the arm in the raised position is shown in ghost outline in FIG. 4. To remove the bicycle, codder pin 62 is removed, the arm is lowered and clamp 72 is disengaged from bicycle frame 58. The step of pivoting arm 24 from its lower position (FIG. 2) into its raised position (FIG. 4) is relatively easy to accomplish because of the pivoting action of hinge mechanism 30. Alternatively, an electric motor may be provided to accomplish the task of pivoting arm 24 from its lowered position into its raised position. Ideally, such an electric motor would use the car's own electrical system to provide the electric power necessary to operate the electric motor. A hydraulic system may also be used as a lifting means for lifting arm 24.

It is possible to rearrange the relative positions of wheel wells 64 and clamp 72 so that the bicycle does not have to be inverted in order to be secured to arm 24. Also, it is possible to modify hinges 30 so that they can slide back and forth along beams 16, in which case a bicycle may be loaded onto the arm, tilted into position and then slid onto the centre of the rack portion of the vehicle roof rack.

Luggage may be loaded onto the roof 15 of vehicle 14 by attaching the luggage to arm 24 by means of straps or bungee cords. Alternatively, clamp 72 may be modified to directly clamp onto and hold the luggage. Roof rack 10 may be provided with a plurality of elongate arms and clamps similar to arm 24 and clamp 72 in order to better secure luggage.

In another embodiment of the device, arm 24 may be provided with a housing for containing smaller pieces of luggage or other objects. The housing may comprise a clamshell case which is provided with a releasable lock for locking the two halves of the case. The case may be opened when the arm is in its lowered position and the smaller pieces of luggage are then placed inside the case. The case is then locked closed and the arm is pivoted to its raised position and then locked in place.

Skiis may be carried on the device by securing them directly to arm 24 with the aid of straps or bungee cords. Alternatively, clamp 72 may be modified to clamp directly onto the skis. A plurality of clamps may be provided on the arm in order to mount several skiis at once. Hinge 30 may be modified to lower arm 24 over the roof 15 of the car such that the arm and the skis mounted thereto lie flat over the roof of the car.

While the vehicle roof rack has been illustrated and described with respect to the preferred embodiment, it will be appreciated by those skilled in the art that numerous variations of these embodiments may be made without departing from the scope of the invention.

Therefore what is claimed is:

1. A roof rack attached to a roof of a vehicle for holding a bicycle, the roof having opposed side edge and the vehicle having a side portion extending substantially downwardly from each side edge, comprising:
   a) a frame attachable on top of the roof of the vehicle, the frame including a pair of spaced beams and at least one cross member extending therebetween having opposed end portions, each beam respectively being pivotally coupled to the end portions of said cross member for movement about an axis substantially parallel to a longitudinal axis of said beam, each beam being adapted to engage the wheels of a bicycle;
   b) at least one arm member having a first end rigidly attached to one of said beams and a second end, the arm member being pivotally movable with respect to said pivotal movement of beam between a first position wherein said second end of the arm member is positioned substantially below said roof and adjacent to but spaced from the side portion of the vehicle and a second position wherein said second end of the arm member is positioned substantially above the roof of the vehicle;
   c) lock means for releasibly locking the arm member in said second position; and
   d) attachment means in connection with said second end of said member for releasably attaching a portion of said bicycle to the arm member.

2. The roof rack according to claim 1 wherein the attachment means is adjustably movable along the arm member.

3. The roof rack according to claim 2 wherein the arm member is provided with an elongate slot, wherein the attachment means is engaged with the elongate slot and movable therealong.

4. The roof rack according to claim 1 wherein at least one of said beams includes wheel engagement means in connection thereto for engaging at least one wheel of said bicycle.

* * * * *